July 25, 1961  P. BUFFET-BEAUREGARD ET AL  2,994,020
SERVOMOTOR CONTROL FOR STORING VARIABLES
Filed Sept. 12, 1958  3 Sheets-Sheet 2

INVENTORS
Paul Buffet-Beauregard
Jean Goupil
Jean Megy
André Roguin
BY Bacon & Thomas
ATTORNEYS July 25, 1961  P. BUFFET-BEAUREGARD ET AL  2,994,020
SERVOMOTOR CONTROL FOR STORING VARIABLES Filed Sept. 12, 1958  3 Sheets-Sheet 3

INVENTORS
Paul Buffet-Beauregard
Jean Goupil
Jean Megy
André Roguin
BY Bacon & Thomas ATTORNEYS

United States Patent Office

2,994,020
Patented July 25, 1961

2,994,020
SERVOMOTOR CONTROL FOR STORING VARIABLES
Paul Buffet-Beauregard, Paris, Jean Goupil, Fontenay aux Roses, Jean Mégy, Paris, and André Roguin, Seine, France, assignors to Commissariat l'Energie Atomique, Paris, France
Filed Sept. 12, 1958, Ser. No. 760,683
Claims priority, application France Sept. 16, 1957
5 Claims. (Cl. 318—28)

The present invention has for its object a device for memorizing the magnitudes of several variables which are available in the form of electric quantities of analogical character, such as voltages, the instantaneous values of which are to be memorized for subsequent use.

It is known that a servo-mechanism which makes the angular position of a shaft depend on the instantaneous value of an electrical voltage representing a variable, in itself constitutes an elementary memory storage device. In a device of this kind, a motor driving said shaft is fed by a voltage which is the difference between the voltage representing the variable and a voltage indicating the angular position of the shaft, which latter voltage is derived, for example, from a potentiometer fed by a constant voltage, the slider of the potentiometer being fixed to said shaft.

It is also known to set at a given instant the angular position of the slider of a rotary potentiometer by means of a clutch, e.g. of the magnetic type, which is actuated until that particular instant whereby, once the position of the slider is set, the regulation effected at that instant is "memorized" on the potentiometer shaft and the clutch is released.

The direct combination of a positioning servomechanism and a clutch potentiometer assembly constitutes a storage device for memorizing an analogical voltage value at the instant said clutch is actuated.

The invention has for its object the construction of a device for the memorizing of the magnitudes of several variables which is of very simple, economic design and capable of extension and of extremely flexible utilization, said device operating operating on the same principle as a memory device for a single variable of the type heretofore referred to.

The present invention consists in a device for memorizing or storing the magnitude of each of a number of variables wherein a servomotor is adapted to drive a number of separate shafts each one corresponding to one of the variables and each one carrying a component of an electrically controlled clutch, the other component of each clutch being connected to a storage device for positioning in accordance with one variable and which carries the slider of a servo-potentiometer and at least one member for the exploitation of the variable to which said storage shaft is allocated, each of which clutches is provided with a control wire connected to one of the terminals of a first selection terminal assembly, and each of which sliders is connected to one of the terminals of a second selection terminal assembly, a single control device being provided for controlling both the above-mentioned selection terminal assemblies in such a way that, at a given instant, the clutch allocated to a variable is actuated and, at the same time, a voltage representative of the difference between the voltage representing a variable at that instant and the voltage derived from the potentiometer allocated to the variable is fed to the servomotor.

It will be understood that a device of this kind lends itself to exhibiting, over and above the essential features such as heretofore defined, also other features which will depend on the intended application.

The invention will be better understood with the aid of the following description given with reference to the annexed drawings in which.

It should be well understood that the diagrammatic representations shown here are only illustrative of the possibilities created by the invention and that any modifications regarding the technical means employed, as well as the application, which become evident from the description of these drawings, must be regarded as falling within the scope of the present invention.

Figure 1:
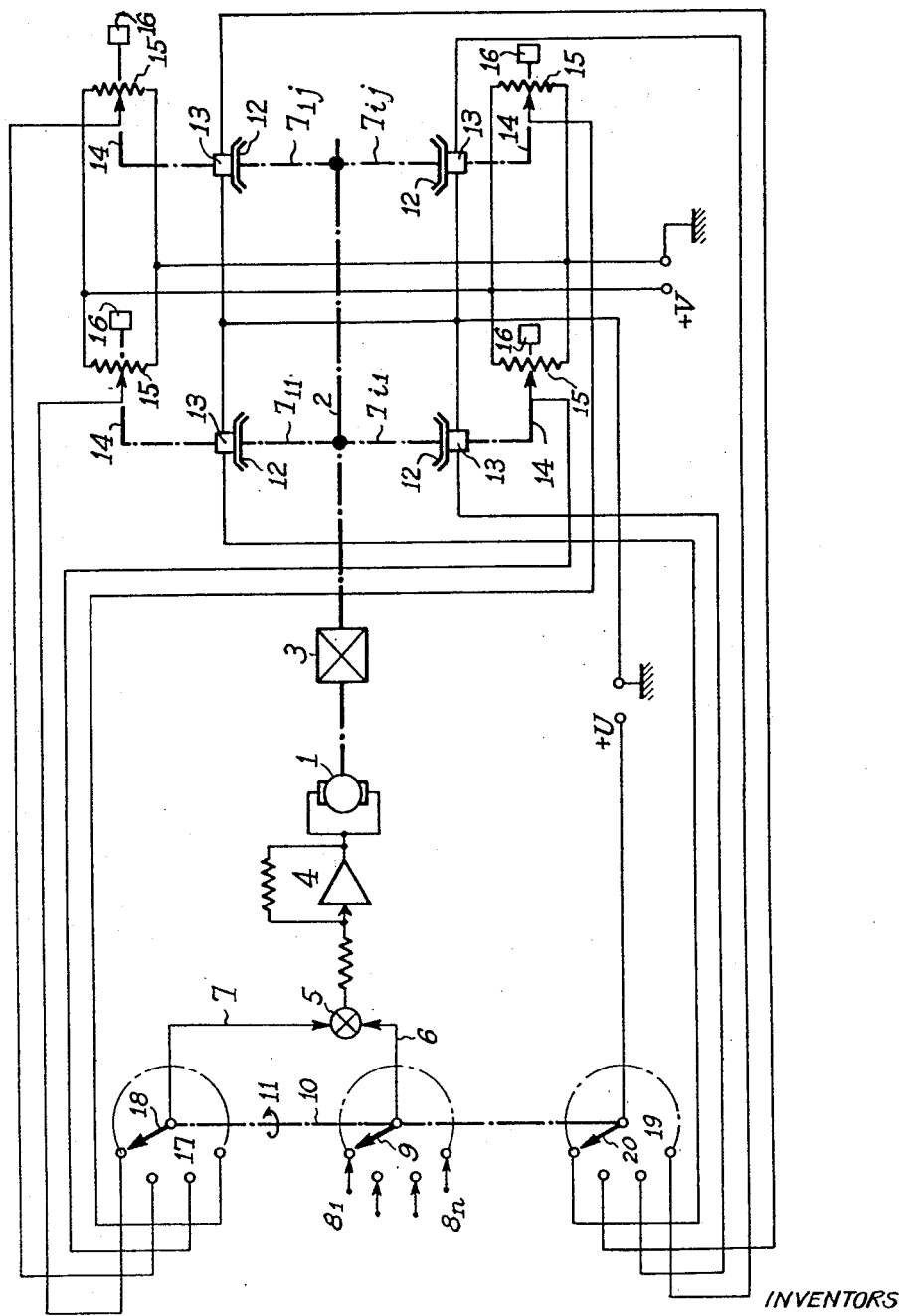
FIGURE 1 is a diagrammatic representation of a memory device for several variables showing the essential features of the present invention.

Reference is made, first of all, to FIGURE 1 in which an electric servomotor 1 is shown which drives a geared shaft 2, through a reduction gear 3. The servomotor 1 is energized by the output voltage of an amplifier 4 fed by the output of a voltage comparison device 5 which furnishes a voltage being the difference of the two voltages which it receives through the leads 6 and 7.

The amplifier 4 has been represented in the conventional form of a servo-amplifier, and, if this is sufficient, it will be understood that the comparison device 5 need only comprise a mixer with two resistances and, consequently, the resistance indicated in series with the amplifier 4 can be omitted. The amplifier 4 and the servomotor 1 should be arranged in such a way that the servomotor may be driven in both rotary senses since the memorizing process must of course be capable of registering increases as well as decreases of the variables. The voltages representing the different variables can, but need not necessarily, be available simultaneously and continually at the terminals $8_1$ to $8_n$ of a rotary distributor 9 which is electrically connected to the lead 6 and controlled by the rotation of a shaft 10, the whole device being adapted however to the manner in which this memory device is to be exploited. Merely in order to illustrate the principle of the device, let it be assumed that the drive of shaft 10 moves in the sense of the arrow 11 and that, in such a case, it is the object to effect a cyclic sequential exploration of the variables applied to the terminals $8_1$ to $8_n$. This rotary distributor 9 can obviously be omitted if the object is to distribute over the several memorizing elements "sample" states occurring during the period of one signal, simple or complex, and arriving over a single path, such being the case, for example, when there are distributed over the memorizing elements the de-coding voltages of a storage device for computed numerical results which device receives such results sequentially.

The shaft 2 is a geared shaft driving simultaneously groups $7_{11}$ to $7_{i1}$ and $7_{1j}$ to $7_{ij}$ ($i=1, 2, \ldots n$ and $j=1, 2 \ldots m$) of shafts which rotate the components 12, the latter being for example magnetic armatures forming part of magnetic clutches the electromagnets of which are denoted by the numerical reference 13. Each of these electromagnets therefore can, as any one clutch engages on excitation, rotate together with the corresponding one of the shafts $7_{11}$ to $7_{ij}$ and drive in turn the corresponding memorizing shaft 14. On the shafts 14 are fixed the movable components, e.g. the sliders, of servopotentiometers 15, and of the exploiting means 16 consisting, according to the given requirements, of a device indicating the position of the memorizing shaft, or of a repeater reproducing this position in analogical electric form (potentiometer, variable capacitor . . .) or in numeral form (position-coding device). The servo-potentiometers 15 can be divided in their windings between a common high tension +V and one earth connection for each of them. They can of course also be divided, if necessary, between a high tension of one particular sign and a high tension of the opposite sign or, alternatively, their "reference" tensions may have different values if the correspondence relations between the memorizing members and the signals representing the variables to be memorized require this. In special cases, the reference voltage or voltages can of course also be variable in time, in a predetermined manner or depending on the progress of one or more phenomena, each storage operation in such a case being effected as a result of the composition of the "reference" variable and of the input variable relative thereto.

Correspondence between a memorizing device and the variable to be memorized is achieved in the example shown here by the fact that the leads of the sliders of the potentiometers 15 are connected to the different terminals of a switch 17 the wiper 18 of which is connected to the lead 7, which enters the voltage comparison device 5, and is driven sychronously with the wiper 9 of the distributor for the input variables. It is achieved also by the fact that another switch 19 is provided the wiper 20 of which receives an actuating voltage +U for the clutches and is driven in conjunction with the wipers 9 and 18, the contacts of the switch 19 being wired to the various electromagnets of the clutches of the device.

The above-described device operates as follows:

According to the pace at which the shaft 10 rotates, the voltage representing the variables applied to terminals $8_1$ to $8_n$ successively act upon the input of the voltage comparison device 5. This advance can of course operate in a stepwise manner, in consideration of the response delay inherent in the mechanical parts of the system. At each step, a particular clutch is actuated, and the voltage derived from the wiper of the potentiometer coupled with this clutch is applied to the input 7 of the comparison device 5. The latter thereupon supplies to the amplifier 4 the control signal which causes the rotation of servomotor 1 and which continues until it is compensated (when encountering the threshold of the comparison device) during which time the shaft 2 rotates, so that the shafts 7 and, due to the actuated clutch, the shaft 14 linked to that clutch also turn whereby a fresh positioning of the slider of the relevant potentiometer is achieved. The sequence of the particular servo-mechanism, which was temporarily set up at this instant of operation, will then have played its part, and a further advance movement can thereafter be imparted to the shaft 10, for the purpose of memorizing the next-following variable on another potentiometer, and so forth.

Figure 2:
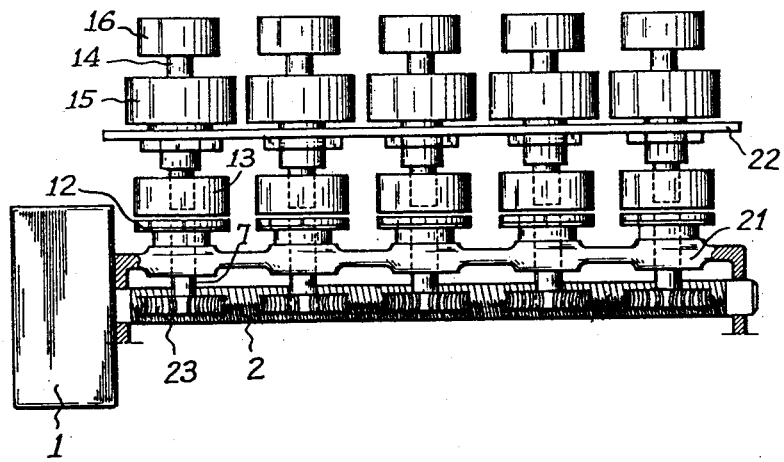
FIGURES 2 and 3 are, respectively, a lateral part view and a sectional elevation of a first embodiment of the electromechanical section of a device according to the present invention.
Figure 3:
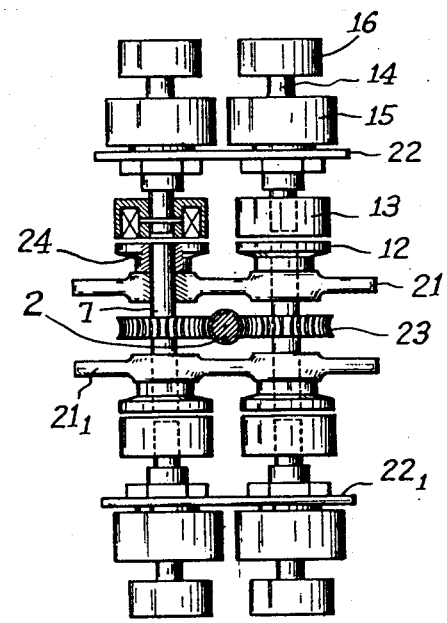

In the embodiment of the electro-mechanical part shown in FIGURES 2 and 3, the geared shaft 2 is an endless screw along which pairs of toothed gears 23 are distributed, each gear 23 driving a shaft 7 on which it is fastened. The shaft 7 is rotated, one way or the other, by the gear 23, in bearings mounted on the chassis plates 21 and $21_1$. At the end of every shaft 7 is arranged a flector 24 rigid in radial direction, but of a certain resilience in axial direction, and on this flector is fixed a disc 12 which constitutes the magnetic armature of a clutch the electromagnetic "cup" of which is indicated at 13 and shown in section in one of the clutches appearing in the diagram of FIGURE 3. Each electromagnet is fastened to the end of a memorizing shaft 14 supported by a bearing which is mounted on one or the other of the chassis plates 22 and $22_1$, as the case may be. On the other side of this bearing are mounted, for example, the potentiometer 15 and the exploiting means 16 belonging to this particular memorizing shaft 14, the movable parts of said potentiometer and said exploiting means being connected to the shaft.

In this embodiment, then, there are shown groups constituted by four sub-assemblies for the memorizing of variables at every station along the endless screw 2 (FIG. 3), and, also by way of illustration, there are indicated in FIGURE 2 five of these sub-assemblies distributed along the endless screw. With reference to what was stated above by way of defining the memorizing device according to the invention, the factor $i$ in this example is taken to equal 4, while the factor $j$ equals 5.

Figure 4:
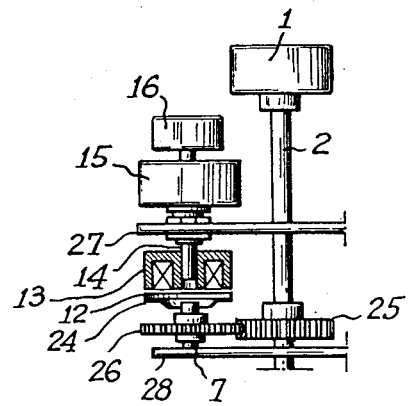
FIGURES 4 and 5 represent a part-sectional elevation of two modifications of an embodiment according to the invention.
Figure 5:
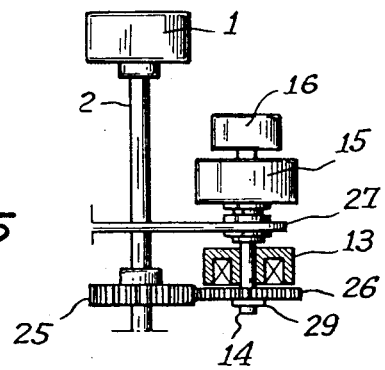
Figure 6:
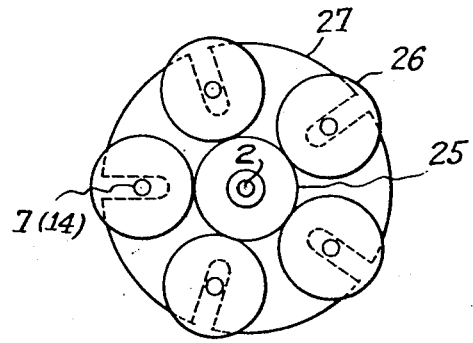
FIGURE 6, which can be studied in conjunction with FIGURE 4 or FIGURE 5, is an end view of the devices shown in these FIGURES 4 and 5.

In the second embodiment contemplated here, shown in FIGURES 4, 5 and 6, there are provided along the geared shaft 2 which in this case is smooth, a certain number of toothed gears 25 which are integral with said shaft. Each one of the toothed gears 25, a number $j$ of which should be assumed to be distributed along the shaft 2, the latter being driven by servomotor 1, see FIGURES 4 and 5, engages a plurality of toothed gears 26, a number $i$ of which is provided, and these gears 26, in order to achieve contact for the purpose of unified transmission, should of course be limited to five in number, this maximum number being indicated in FIGURE 6.

Turning now more particularly to FIGURE 4, it will be seen that each toothed gear 26 is mounted on a shaft 7, the latter being supported by a chassis plate 28. At the end of each shaft 7 is fixed a flector 24 which carries an armature plate 12 forming part of a magnetic clutch, as in the case of the assembly shown in FIGURE 3. In opposite relationship thereto, and integral with the memorizing shaft 14, is mounted the "cup" electromagnet of the clutch 13. The shaft 14 is supported in a bearing carried by a chassis plate 27 on the other side of which, in the example shown here, the servo-potentiometer 15 and the exploiting means 16 allocated to the relative variable are fixed on the shaft 14 by means of their movable components.

This assembly which is repeated for each memorizing sub-assembly can be simplified in the manner indicated in FIGURE 5. Each one of the toothed gears 26 is loosely mounted at the end of the shaft 14 itself, the shaft 7 being omitted, and a circlip 29 prevents the gear 26 from sliding off the end of shaft 14. The toothed gear 26 however consists of a magnetic material and constitutes the armature of the clutch. When it is attracted, the toothed gear 26 will therefore become integral with the electromagnet 13 and thus ensure the driving of shaft 14 on which the electromagnet 13 is fixed. Otherwise the arrangement remains substantially the same as in the case of the embodiment shown in FIGURE 4.

What we claim is:

1. A device for memorizing a plurality of variables comprising: a servomotor; a plurality of shafts connected to said servomotor to be driven thereby, each shaft corresponding to one of the variables; a first clutch component connected to each shaft; a second clutch component located adjacent each first clutch component; a memory shaft connected to each of said second clutch components for positioning in accordance with one variable; a servo-potentiometer in association with each memory shaft having its slider operatively connected to the memory shaft; a source of constant electrical voltage connected to each servo-potentiometer; means in association with each memory shaft for exploiting the variables to which that shaft is allocated; a first selection terminal assembly; means connecting each pair of said first and second clutch components to one of the terminals of said first selection terminal assembly; a second selection terminal assembly; means electrically connecting each slider to one of the terminals of said second selection terminal assembly to feed a reference voltage indicative of the magnitude of the variables stored in the corresponding memory shaft; a third selection terminal assembly; means feeding a voltage representing a variable to selected terminals of said third selection terminal assembly; a voltage comparison device having a pair of inputs and a differential output, an electrical connection between said second selection terminal assembly and one of said inputs, and another electrical connection between said third selection terminal assembly and the other of said inputs, an electrical connection between said differential output and said servomotor; and control means for concurrently controlling said first and second and third selection terminal assemblies whereby at a given instant the clutch components allocated to a variable are actuated and, at the same time, a voltage, representative of the difference between the applied voltage representing a variable at that instant and the reference voltage derived from the potentiometer allocated to the variable, is fed to the servomotor.

2. A device as claimed in claim 1, wherein the drive to said plurality of shafts comprises an endless screw arranged to be driven by the said servomotor and a plurality of toothed gears each one secured to one of the said shafts, said gears being located in spaced-apart relationship along the length of said endless screw and cooperating therewith.

3. A device as claimed in claim 2, wherein each of said first clutch components consists of a rotatable disc attached to and capable of axial displacement along its associated shaft and constituting an armature for cooperation with the adjacent second clutch component in the form of an electromagnet.

4. A device as claimed in claim 1, wherein the drive to said plurality of shafts comprises an output shaft arranged to be driven by the said servomotor, first toothed gears arranged in spaced axial relationship along said output shaft and at least one second toothed gear secured to a memory shaft and meshing with each first toothed gear.

5. A device as claimed in claim 4, wherein each second toothed gear forms a first clutch component constituting an armature for cooperation with the adjacent second clutch component in the form of an electromagnet.

References Cited in the file of this patent
UNITED STATES PATENTS

| | | |
|---|---|---|
| 2,774,559 | MacCallum | Dec. 18, 1956 |
| 2,792,542 | Robinson | May 14, 1957 |
| 2,873,439 | Lahti et al. | Feb. 10, 1959 |